United States Patent
Perdue et al.

(10) Patent No.: US 11,208,025 B2
(45) Date of Patent: Dec. 28, 2021

(54) TRANSPORT TRAILER AND METHOD FOR TRANSPORTING AN OVERSIZE LOAD

(71) Applicant: Gulfstream Aerospace Corporation, Savannah, GA (US)

(72) Inventors: James Perdue, Savannah, GA (US); Timothy Bago, Lapeer, MI (US); Thomas Endress, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 9 days.

(21) Appl. No.: 16/799,539

(22) Filed: Feb. 24, 2020

(65) Prior Publication Data

US 2021/0213864 A1 Jul. 15, 2021

Related U.S. Application Data

(60) Provisional application No. 62/960,988, filed on Jan. 14, 2020.

(51) Int. Cl.
*B60P 3/00* (2006.01)
*B62D 33/02* (2006.01)
*B60P 1/44* (2006.01)
*B60D 1/01* (2006.01)

(52) U.S. Cl.
CPC .............. *B60P 1/4407* (2013.01); *B60D 1/01* (2013.01); *B60P 1/4471* (2013.01); *B60P 3/00* (2013.01); *B62D 33/02* (2013.01)

(58) Field of Classification Search
CPC ......... B60P 1/4407; B60P 1/4417; B60P 3/00; B62D 33/02

USPC ....................................................... 410/44, 45
See application file for complete search history.

(56) References Cited

U.S. PATENT DOCUMENTS

| | | | | |
|---|---|---|---|---|
| 2,725,241 A | * | 11/1955 | Leonard, Jr. .............. | B64F 5/50 410/44 |
| 3,655,218 A | * | 4/1972 | Taylor ....................... | B60P 3/00 410/44 |
| 5,683,213 A | * | 11/1997 | Baur ......................... | B60P 3/00 280/405.1 |
| 5,909,989 A | * | 6/1999 | Baur ......................... | B60P 7/08 410/44 |

(Continued)

FOREIGN PATENT DOCUMENTS

| CH | 436128 A | 5/1967 |
|---|---|---|
| CN | 203698077 U | 7/2014 |

*Primary Examiner* — Kaitlin S Joerger
(74) *Attorney, Agent, or Firm* — LKGlobal | Lorenz & Kopf, LLP

(57) ABSTRACT

A transport trailer and a method for transporting an oversize load are provided. In one nonlimiting example, the transport trailer includes a trailer. The trailer includes an elongated body that extends in a length direction and that has an upper base surface. A support assembly is configured to support the oversize load and is pivotably coupled to the trailer to move between a first position and a second position. In the first position, the support assembly extends over the upper base surface and beyond the trailer in a width direction that is transverse to the length direction to define a wide load overhang that extends beyond the trailer in the width direction. In the second position, the support assembly is positioned at an incline relative to the first position to one of reduce and eliminate the wide load overhang.

19 Claims, 11 Drawing Sheets

(56) References Cited

U.S. PATENT DOCUMENTS

| | | | | |
|---|---|---|---|---|
| 5,947,665 | A * | 9/1999 | Baur | B60P 7/08 |
| | | | | 410/44 |
| 6,848,880 | B2 * | 2/2005 | Erech | B60P 3/00 |
| | | | | 410/44 |
| 7,481,609 | B2 * | 1/2009 | Abel | B60P 3/40 |
| | | | | 410/101 |
| 7,794,189 | B2 * | 9/2010 | Erech | B60P 7/10 |
| | | | | 410/44 |
| 8,714,594 | B1 * | 5/2014 | Hellbusch | A01D 75/002 |
| | | | | 280/789 |
| 8,961,085 | B2 * | 2/2015 | Ressel | F03D 80/00 |
| | | | | 410/44 |
| 2007/0166118 | A1 * | 7/2007 | Heuvel | B60P 3/00 |
| | | | | 410/44 |
| 2018/0370451 | A1 * | 12/2018 | Wagenbach | B65G 67/04 |

\* cited by examiner

TRANSPORT TRAILER AND METHOD FOR TRANSPORTING AN OVERSIZE LOAD

CROSS-REFERENCE TO RELATED APPLICATIONS

This application is related to and claims all available benefit of U.S. Provisional Patent Application 62/960,988 filed Jan. 14, 2020, the entire contents of which are herein incorporated by reference.

TECHNICAL FIELD

The technical field relates generally to transport trailers, and more particularly, relates to transport trailers for carrying an oversize load and methods for transporting an oversize load.

BACKGROUND

Over-the-road trucking is here to stay. Based on the Bureau of Transportation Statistics, trucking carries more than 10 billion tons of freight annually, and that number is increasing steadily. Of that, 6%, or 600 million tons of all truckloads are oversize loads. An oversize load is any load that exceeds the maximum legal dimension (e.g., width) or dimensions (e.g., width, length, and/or height) as defined by each state in the United States and Canada. Typically, the maximum legal load width is 8.5 feet, and the maximum height limit is 13.5 to 14.5 feet. Legal length, both in definition and measured length, varies significantly from state to state, while the legal load width of 8.5 feet is almost uniform since it is based on the standard width of a highway travel lane, which is typically 12 feet for interstates and major highways.

Any load more than 8.5 feet wide is, by definition, an oversize load, and with few exceptions require a state permit to travel on public highways. Depending upon the state, once the width of a load exceeds 12 or 14 feet, there are additional requirements and or restrictions, such as the requirement for pilot or escort vehicles (P/EV) and limited permitted travel times and routes. Any load that exceeds 16 feet in width becomes a "super-load" and subject to more requirements to ensure that the load can be moved safely. Some super-loads may require temporary road closures in attendance of state police and other law enforcement.

For example, in the aircraft industry, a relatively large component(s), e.g., horizontal stabilizer or the like, may need to be shipped from one location to another for a repair job or other purpose, often on short notice. Frequently, such components, when loaded and crated or otherwise packaged for transport on a trailer, are an oversize load exceeding the maximum legal load width of 8.5 feet. In the case of horizontal stabilizers, super-load widths that exceed 16 feet arise, which significantly exceed the legal load width of 12 or 14 feet where additional requirements and or restrictions, such as the requirement for pilot or escort vehicles (P/EV) and limited permitted travel times and routes, are in effect. Just reducing the transport load width from 16 feet or above to just below 16 feet (e.g., 15 feet and 11 inches) can reduce shipping cost nearly in half (e.g., from $30,000 to $16,000 for about a 1000 mile trip), and further reducing the transport load width to just below 12 or 14 feet can significantly reduce or eliminate additional requirements and or restrictions, thereby further reducing cost, shipping time, and/or complexity.

Accordingly, it is desirable to provide a transport trailer for carrying an oversize load, and a method for transporting an oversize that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a transport trailer for carrying an oversize load, and various non-limiting embodiments of a method for transporting an oversize load, are provided herein.

In a first non-limiting embodiment, the transport trailer includes, but is not limited to, a trailer. The trailer includes an elongated body that extends in a length direction and that has an upper base surface. The transport trailer further includes, but is not limited to, a support assembly that is configured to support the oversize load and that is pivotably coupled to the trailer to move between a first position and a second position. In the first position, the support assembly extends over the upper base surface and beyond the trailer in a width direction that is transverse to the length direction to define a wide load overhang that extends beyond the trailer in the width direction. In the second position, the support assembly is positioned at an incline relative to the first position to one of reduce and eliminate the wide load overhang.

In another non-limiting embodiment, the method includes, but is not limited to, the step of coupling a transport trailer that includes a trailer to a prime mover. The trailer includes, but is not limited to, an elongated body that extends in a length direction and that has an upper base surface. The method includes, but is not limited to, the step of mounting the oversize load onto a support assembly that is pivotably coupled to the trailer and that is in a first position extending over the upper base surface and beyond the trailer in a width direction that is transverse to the length direction to define a wide load overhang. The wide load overhang extends beyond the trailer in the width direction. The method includes, but is not limited to, the step of moving the support assembly to a second position at an incline relative to the first position to one of reduce and eliminate the wide load overhang. The method includes, but is not limited to, the step of transporting the transport trailer with the prime mover while supporting the oversize load with the support assembly in the second position.

In another nonlimiting embodiment, the transport trailer includes, but is not limited to, a trailer including an elongated body that extends in a longitudinal direction and that has an upper base surface. The transport trailer further includes, but is not limited to, a support assembly that is configured to support the oversize load and that is pivotably coupled to the trailer to move between a first position and a second position. In the first position, the support assembly extends over the upper base surface and beyond the trailer to define an overhang portion that extends beyond the trailer in an outwardly direction. In the second position, the support assembly is positioned at an incline relative to the first position to one of reduce and eliminate the overhang portion.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
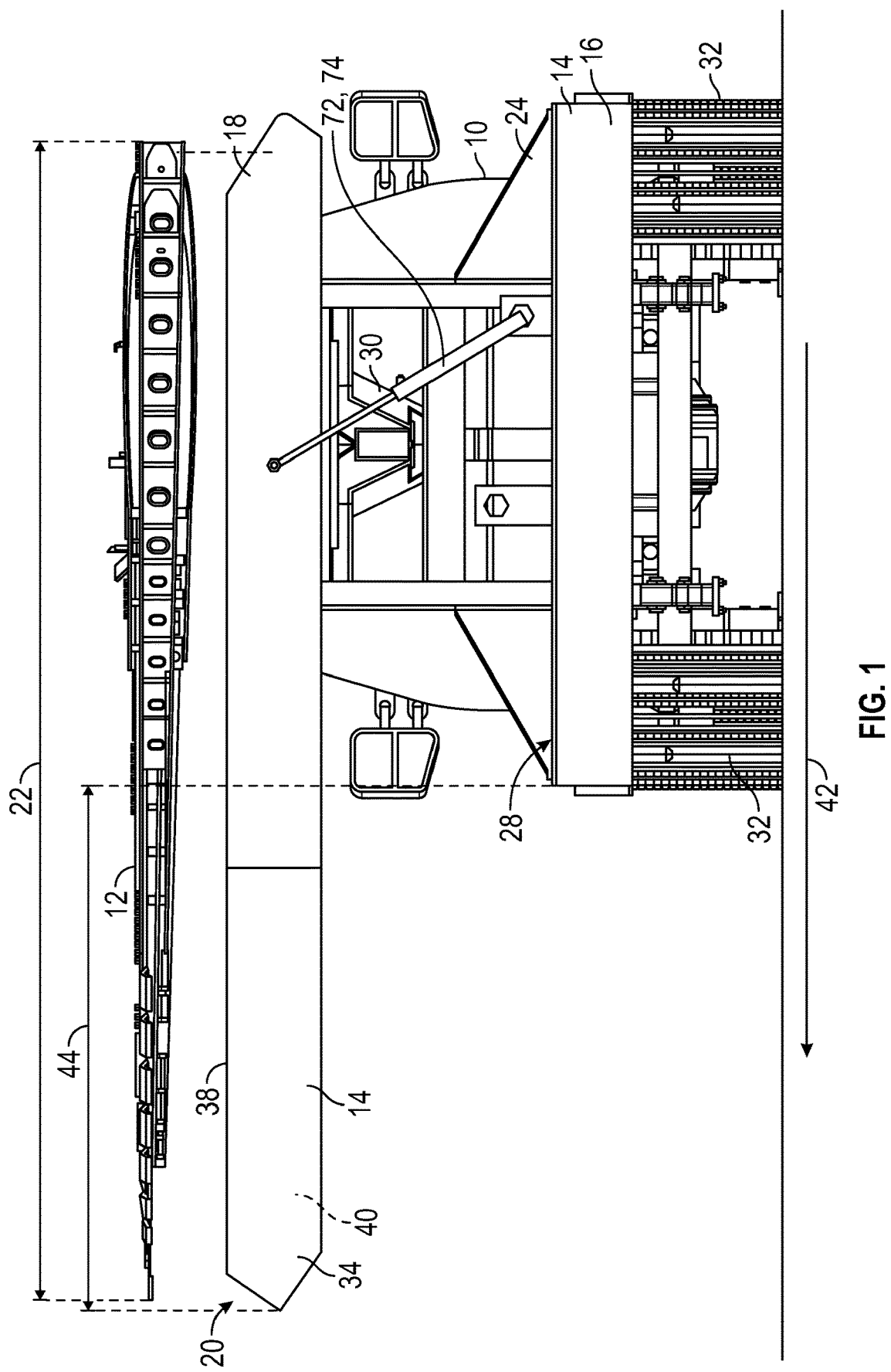
FIG. 1 illustrates a rear view of a prime mover, an oversize load, and a transport trailer including a trailer and a support assembly in a first position in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various nonlimiting embodiments contemplated herein relate to a transport trailer for carrying an oversize load. In one nonlimiting embodiment, the transport trailer includes a trailer that has an elongated body extending longitudinally in a longitudinal or length direction. The elongated body has an upper base surface, for example that is substantially horizontal (e.g., upper deck surface, flat bed surface or the like). A support assembly is arranged over the upper base surface and is pivotably coupled to the trailer to move between a first position and a second position. In the first position, the support assembly extends over the upper base surface and beyond an edge of the trailer in a width direction that is transverse to the length direction to define a wide load overhang that extends beyond the trailer in the width direction. As used herein, the term "wide load overhang" refers to the portion of the support assembly that extends beyond the edge of the trailer in the width direction. In the second position, the support assembly is positioned at an incline relative to the first position to reduce and/or eliminate the wide load overhang.

In an exemplary embodiment, an oversize load is mounted onto the support assembly when it is in the first position. In one example, the support assembly includes a box that receives the oversize load when the box is in the first position extending over the upper base surface and beyond the trailer in the width direction. The support assembly including the box containing the oversize load is rotated or otherwise moved to the second position to reduce and/or eliminate the wide load overhang, thereby reducing the resultant horizontal width of the support assembly. As such, when the support assembly is in the second position, substantially more of the support structure including the box with the oversize load is disposed over the upper base surface of the trailer than when the support structure is in the first position. The transport trailer is coupled to a prime mover, such as a truck, other motor vehicle or the like, to transport the oversize load with the support assembly in the second position.

In an exemplary embodiment, it has been found that by mounting the oversize load onto the support assembly in the first position, oversize loads having a width of about 8.5 feet or greater can be efficiently loaded onto and accommodated by the trailer with the additional support provided by the wide load overhang of the support assembly. Further, by moving the support assembly to the second position to reduce and/or eliminate the wide load overhang, the support assembly including oversize load can be efficiently transported with a reduced resultant horizontal width to reduce cost, shipping time, and/or complexity.

FIG. 1 illustrates a rear view of a prime mover 10, an oversize load 12, and a transport trailer 14 including a trailer 16 and a support assembly 18 in accordance with an exemplary embodiment. As shown, the oversize load 12 is illustrated as being disposed over the support assembly 18 that is in a first position 20 prior to the oversize load 12 being loading onto the transport trailer 14 as will be discussed in further detail below.

The oversize load 12 has a width (indicated by double headed arrow 22) of about 8.5 feet or greater, such as about 8.6 feet or greater, such as about 12 feet or greater, such as about 14 feet or greater, for example is a super-load with a width 22 of about 16 feet or greater. As illustrated, the oversize load 12 is a horizontal stabilizer for an aircraft with a width 22 of about 16.1 feet or greater. Notably, however, in other embodiments, the oversize load 12 may be configured as another relatively wide and/or large component, subassembly, assembly, structure or the like for shipping from one location to another.

Figure 2:
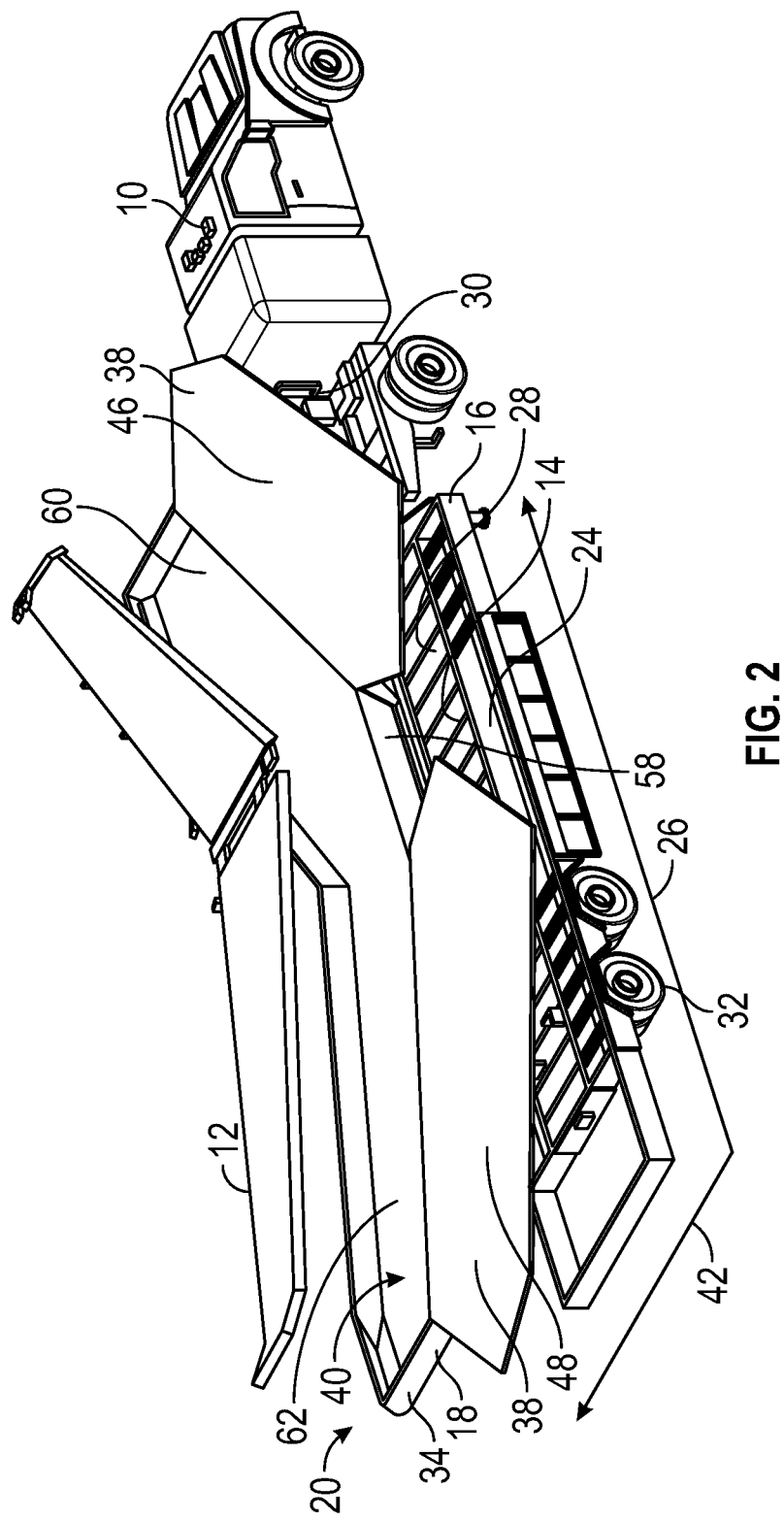
FIG. 2 illustrates a perspective view of a prime mover, an oversize load, and a transport trailer including a trailer and a support assembly in a first position in accordance with an exemplary embodiment.
Figure 3:
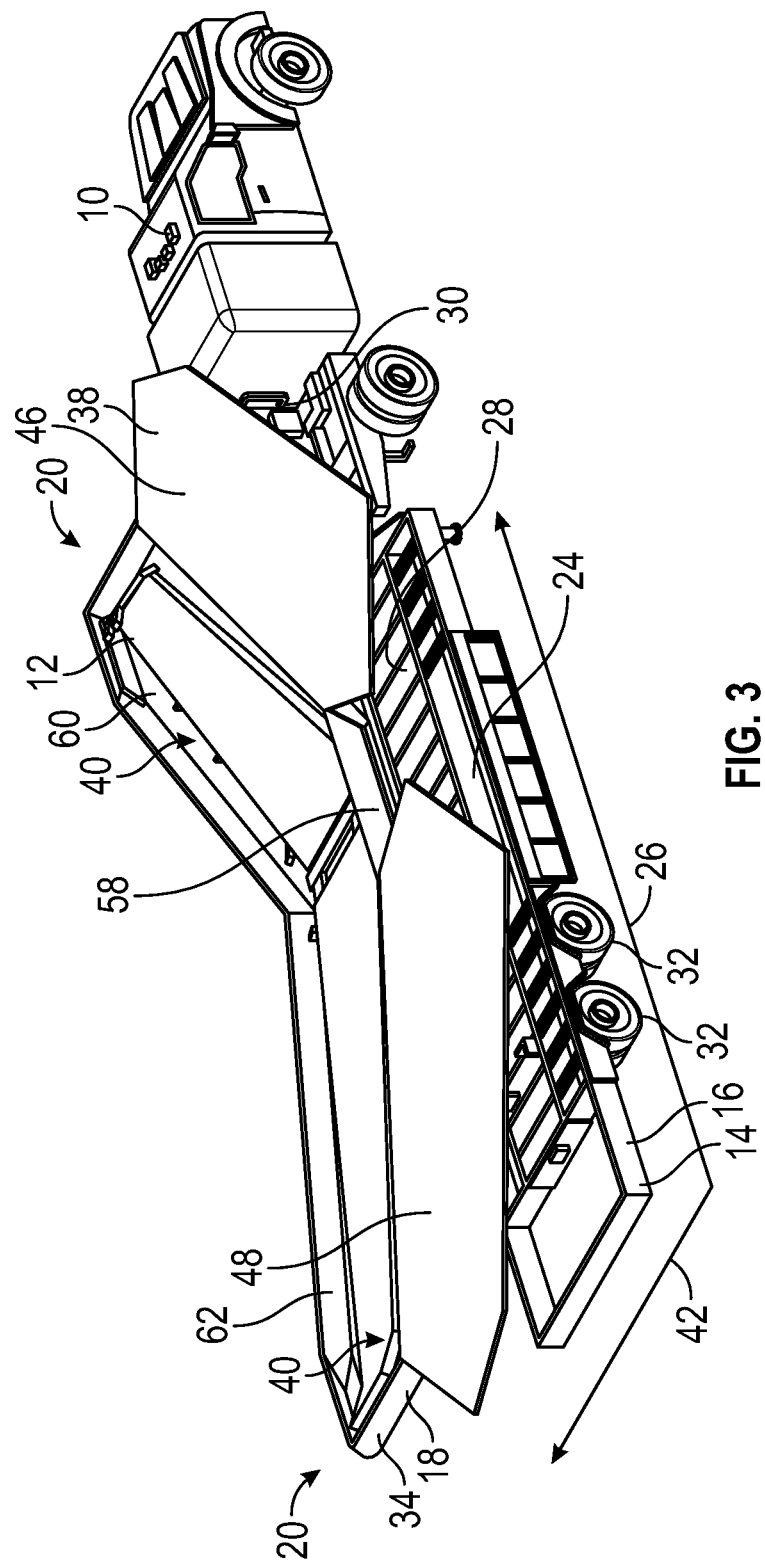
FIG. 3 illustrates a perspective view of a prime mover, an oversize load, and a transport trailer including a trailer and a support assembly in a first position in accordance with an exemplary embodiment.
Figure 4:
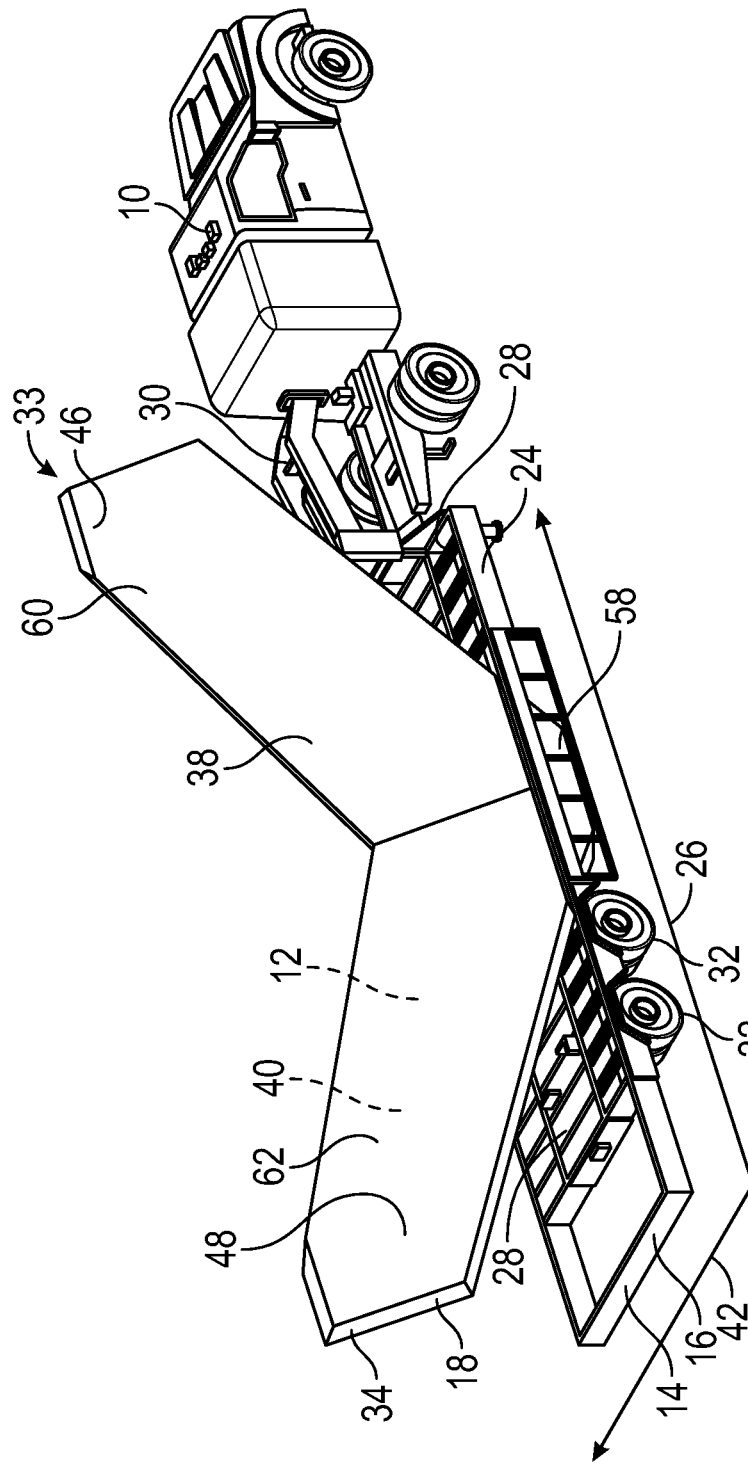
FIG. 4 illustrates a perspective view of a prime mover and a transport trailer including a trailer and a support assembly in a second position in accordance with an exemplary embodiment.
Figure 5:
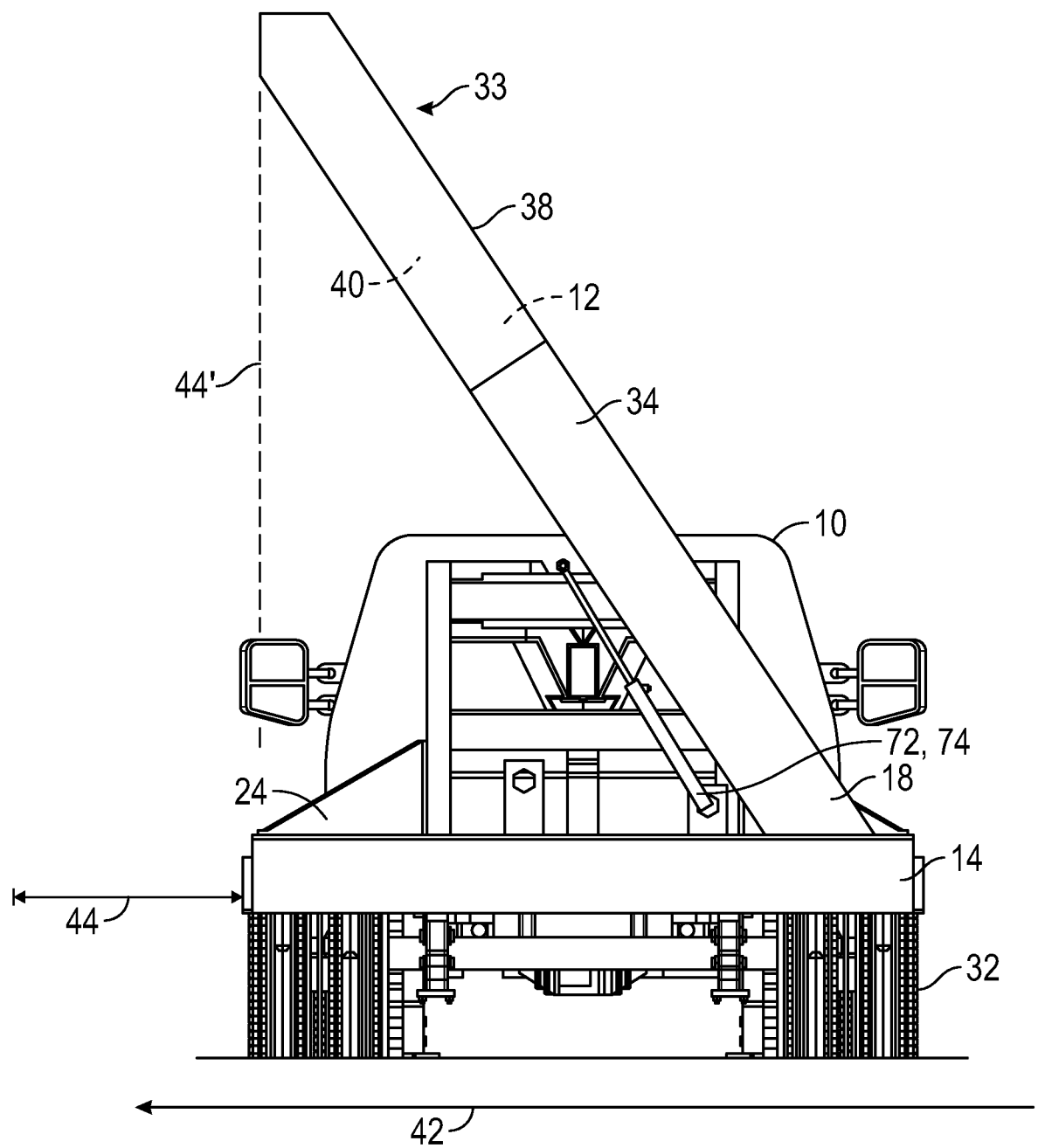
FIG. 5 illustrates a rear view of a prime mover and a transport trailer including a trailer and a support assembly in a second position in accordance with an exemplary embodiment.
Figure 6:
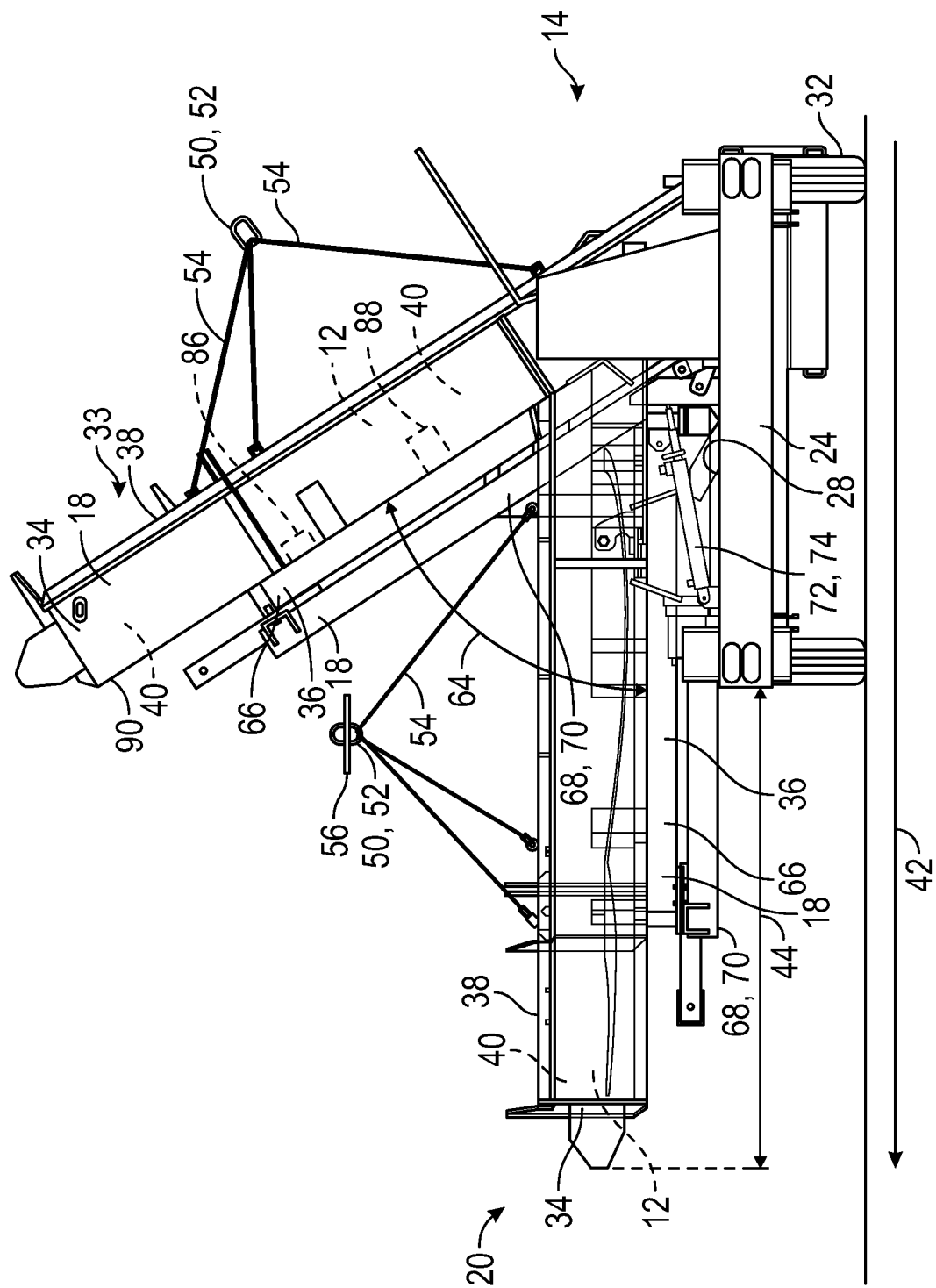
FIG. 6 illustrates a rear view of a transport trailer including a trailer and a support assembly shown in a first position and in a second position in accordance with an exemplary embodiment.
Figure 7:
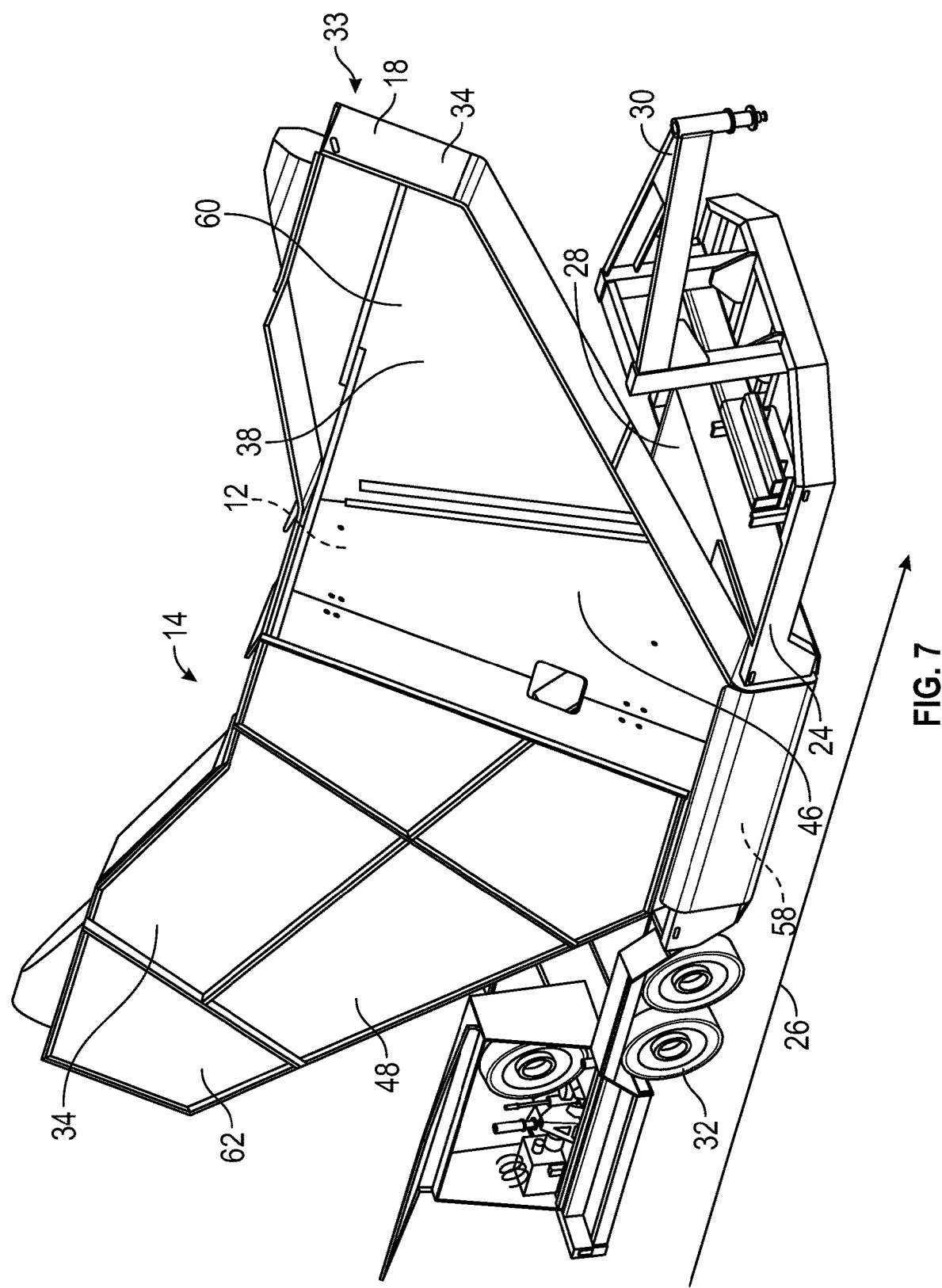
FIG. 7 illustrates a perspective view of a transport trailer including a trailer and a support assembly in a second position in accordance with an exemplary embodiment.
Figure 8:
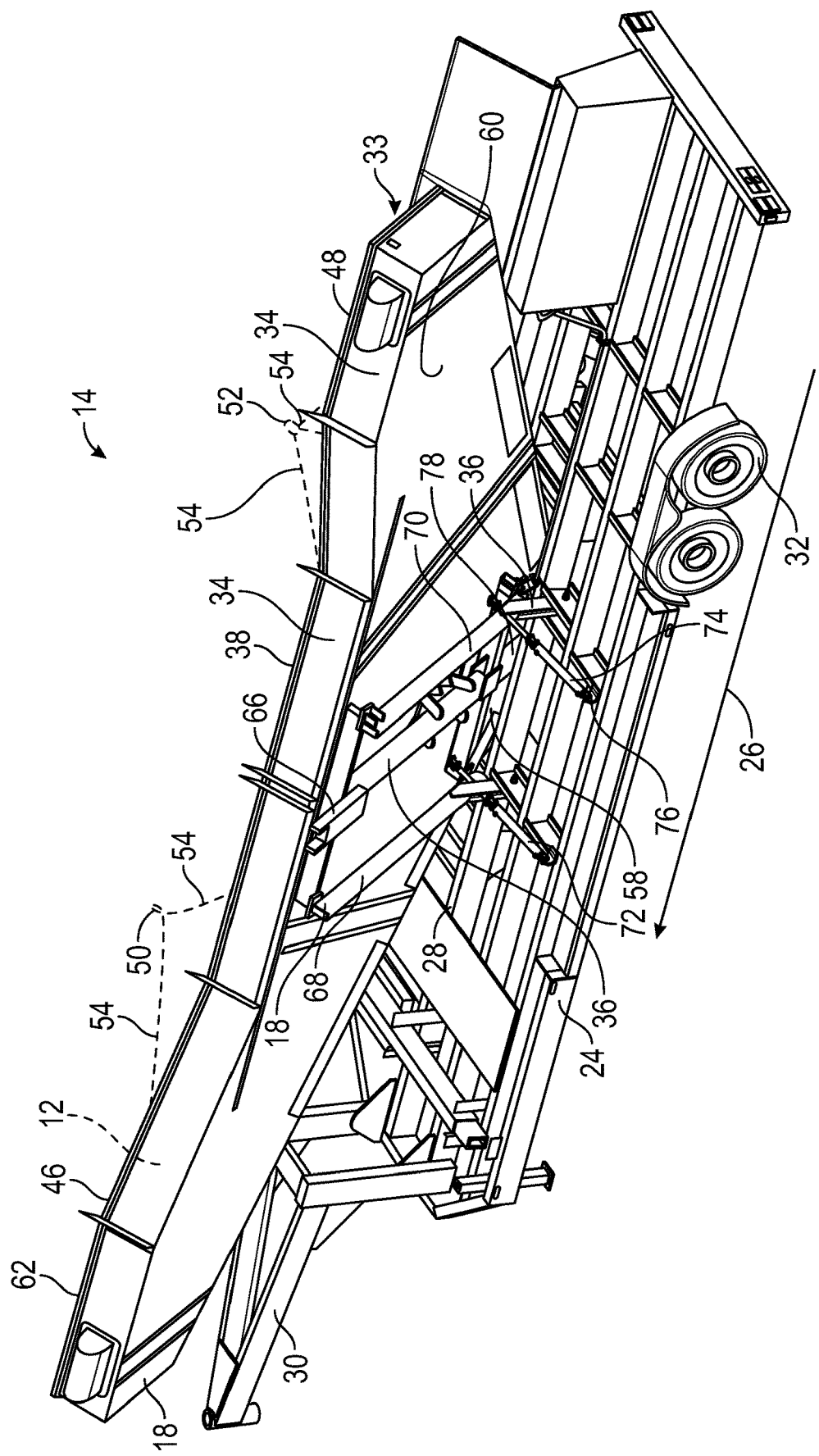
FIG. 8 illustrates a perspective view of a transport trailer including a trailer and a support assembly in a second position in accordance with an exemplary embodiment.

Referring also to FIG. 2, in an exemplary embodiment, the transport trailer 14 includes the trailer 16 that is configured as an open deck design with an elongated body 24 that extends longitudinally in a longitudinal or length direction (indicated by single headed arrow 26) and that has an upper base surface 28 (e.g., bed surface, deck surface, or the like). As illustrated more clearly in FIG. 4, the trailer 16 has a neck portion 30 (e.g., gooseneck portion or the like) that extends from a forward portion of the elongated body 24 to the prime mover 10, such as a truck, 18-wheeler or the like, other motor vehicle or the like. The neck portion 30 of the trailer 16 is attached or otherwise coupled to the prime mover 10 via a hitch, coupling, e.g., a fifth wheel coupling, pin, e.g., kingpin, and/or the like. The elongated body 24 includes an understructure that supports the upper base surface 28 and that is coupled to wheels 32 to allow the transport trailer 14 to be pulled, moved, or otherwise transported by the prime mover 10.

Referring to FIGS. 1-8, the support assembly 18 is pivotably coupled to the trailer 16 to move between the first position 20 and a second position 33. In an exemplary embodiment, the support assembly 18 includes a box 34 and a support structure 36 that supports the box 34 and that is pivotally coupled to the elongated body 24. When in the first position 20, the support assembly 18 including the box 34 extends substantially horizontally over the upper base surface 28 and beyond the trailer 16 in a width direction (indicated by double headed arrow 42) that is transverse to the length direction 26 to define a wide load overhang 44 that extends beyond the trailer 16 in the width direction 42.

As illustrated, the box 34 has a lid 38 and a box chamber 40 that is covered or substantially covered by the lid 38 when the lid 38 is closed. When the lid 38 is opened or otherwise removed, the box chamber 40 is exposed so that the oversize load 12 can be loaded or positioned into the box chamber 40 of the box 34, which is substantially horizontal in the first position 20. In an exemplary embodiment, mounting the oversize load 12 onto the support assembly 18 in the first position 20 facilitates loading of the oversize load 12 having a relatively large width 22 of about 8.5 feet or greater because the wide load overhang 44 of the support assembly 18 extends substantially horizontally to help support the relatively large width 22 of the oversize load 12 during placement into the box 34.

In an exemplary embodiment and as illustrated in FIGS. 2-4 and 7-8, the lid 38 includes independent lid sections 46 and 48 that are disposed adjacent to each other when the lid 38 is closed to substantially cover the box chamber 40. Lift coupling elements 50 and 52, e.g., hooks, loops, or the like, are coupled correspondingly to the lid sections 46 and 48 of the lid 38 via a plurality of cables 54. The lift coupling elements 50 and 52 are each configured to receive a movable member 56, e.g., fork or extension from a forklift or the like, for lifting and/or opening the lid 38 including the lid sections 46 and 48 to expose the box chamber 40 for loading (or unloading) the oversize load 12 into the box 34, and vice versa for closing the lid 38.

As discussed above, in one example, the oversize load 12 is a horizontal stabilizer or other like component having a substantially "V-like" shape. In an exemplary embodiment, the box 34 is a substantially "V-shaped" box to advantageously provide efficient packaging for housing the oversize load 12. As illustrated, the "V-shaped" box has an apex portion 58 and leg portions 60 and 62 that flare outwardly from the apex portion 58 in different directions to define a "V-like" shape. The apex portion 58 and the leg portions 60 and 62 are disposed above the upper base surface 28 of the trailer 16 when the support assembly 18 is in the first position 20. Further, when the lid 38 is closed, the lid sections 46 and 48 cover portions of the box chamber 40 that are correspondingly disposed in the leg portions 60 and 62 and may be removed as discussed above to open the lid 38 and expose the corresponding portions of the box chamber 40.

As illustrated in FIGS. 4-8, the support assembly 18 including the box 34 containing the oversize load 12 is rotated or otherwise moved to the second position 33 that is at an incline relative to the first position 20. In an exemplary embodiment, this advantageously reduces and/or eliminates the wide load overhang 44, thereby reducing the resultant horizontal width of the support assembly 18 including the box 34 with the oversize load 12. In an exemplary embodiment, the support assembly 18 is positioned at an angle 64 of from about 45 to about 75° relative to the first position 20. In an exemplary embodiment and as illustrated more clearly in FIGS. 4-5, to further reduce the wide load overhang 44 and the resultant horizontal width and height of the support assembly 18, for example when the box 34 is configured as the "V-shaped" box, in the second position 33, the apex portion 58 is disposed below the upper base surface 28 of the trailer 16, for example in a relief or lower area of the trailer 16 below the upper base surface 28, while the leg portions 60 and 62 are disposed above the upper base surface 28.

Referring to FIGS. 6 and 8-10, in an exemplary embodiment, the support structure 36 includes a support frame 66 and support arms 68 and 70 that are coupled to the support frame 66. As illustrated, the box 34 is mounted to the support frame 66 and the support arms 68 and 70 are pivotably coupled to the elongated body via pivot couplings 71 (e.g., pins, bolts or the like).

In an exemplary embodiment, drivers 72 and 74 are each coupled to the support assembly 18, e.g., directly to the support frame 66, and to trailer 16, e.g., the elongated body 24, to move support frame 66 and the box 34 between the first and second positions 20 and 33. In one example, the drivers 72 and 74 are hydraulic cylinders that each have an end 76 coupled to the elongated body 24 and an opposing end 78 that is coupled to the support frame 66. The hydraulic cylinders move their ends 76 and 78 relative to each other to move the support assembly 18 between the first and second positions 20 and 33. In an exemplary embodiment, the support frame 66 included a sleeve 110 that is coupled to and/or proximate the pivoting end of the support frame 16 and that is configured to receive a lift extension (e.g., fork) from a lifting device (not shown) such as a forklift or the like. The sleeve 110 functions as a backup lifting device to allow the support frame 66 to be moved by the lifting device to move the support assembly 18 between the first and second positions 20 and 33 in the event the hydraulic cylinders fail to operate.

Figure 9:
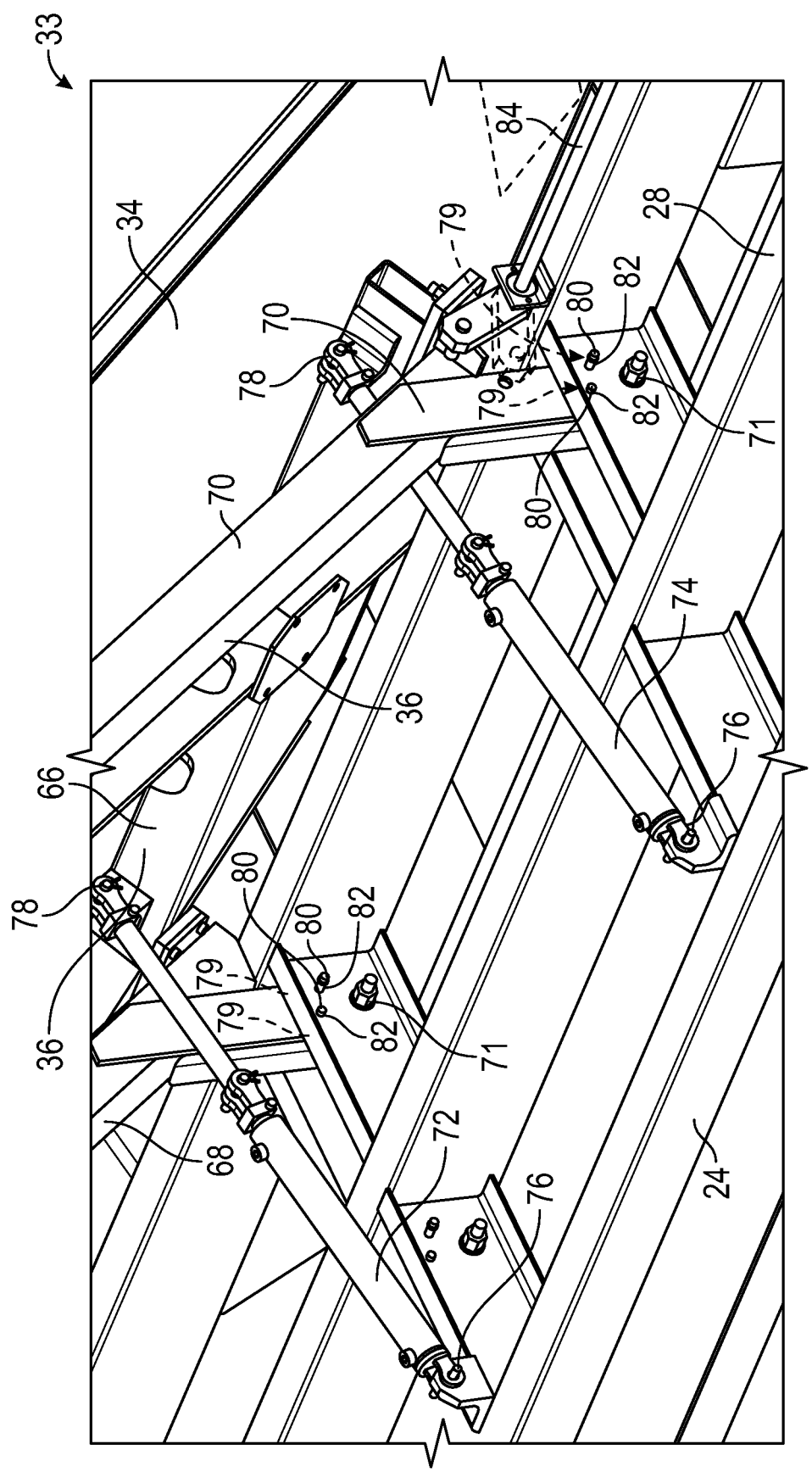
FIG. 9 illustrates a perspective enlarged view of the transport trailer including a trailer and a support assembly in a second position in accordance with an exemplary embodiment.
Figure 10:
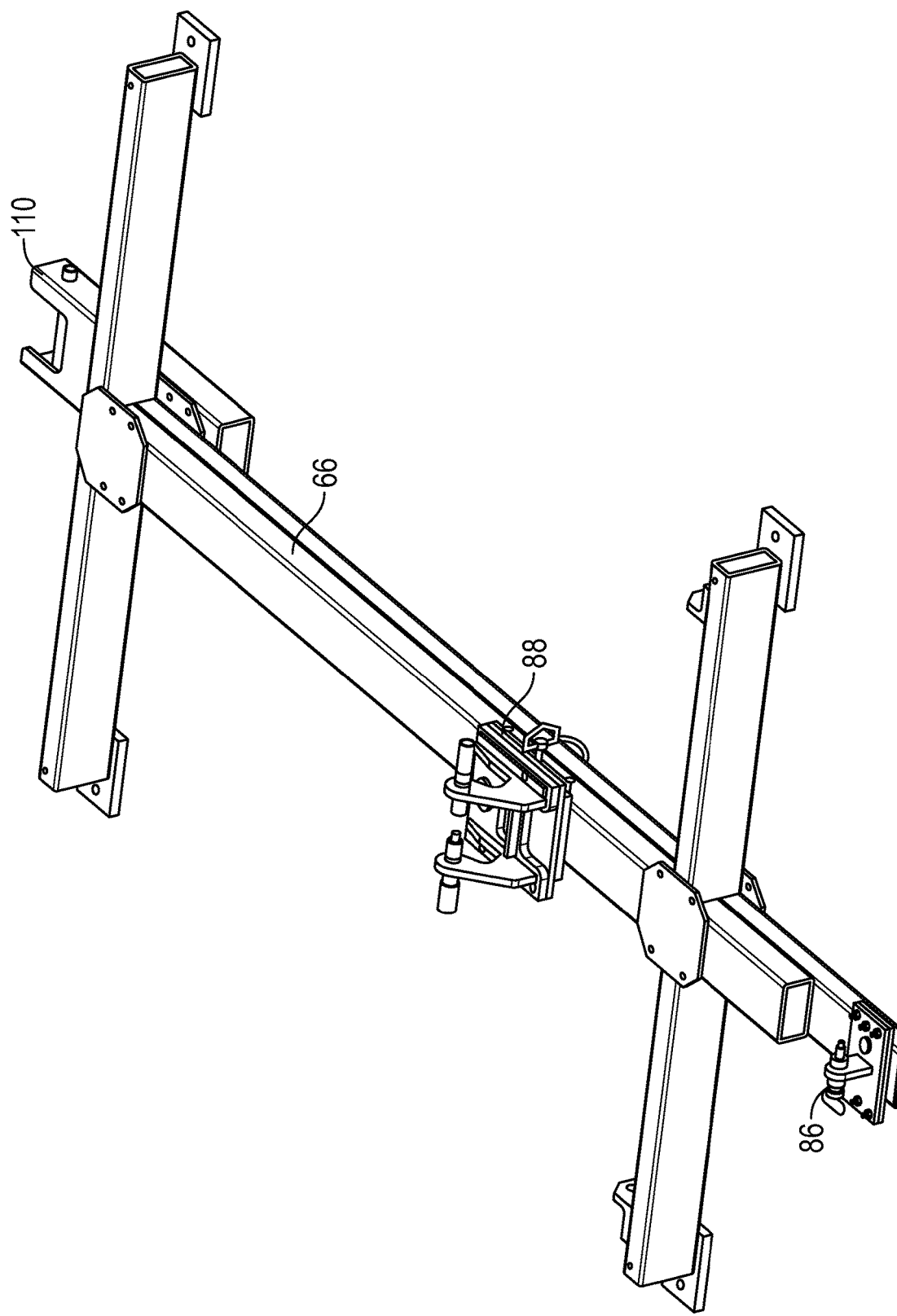
FIG. 10 illustrates a perspective view of a support structure in accordance with an exemplary embodiment.
Figure 11A:
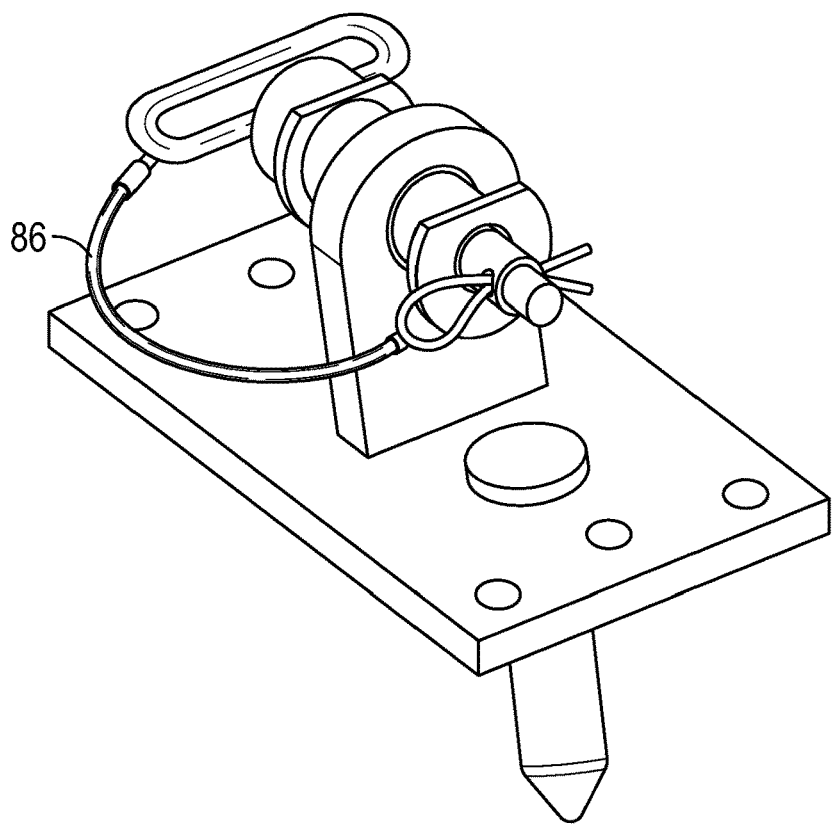
FIGS. 11A-11B illustrate perspective views of pin-bracket attachment components in accordance with various exemplary embodiments.
Figure 11B:
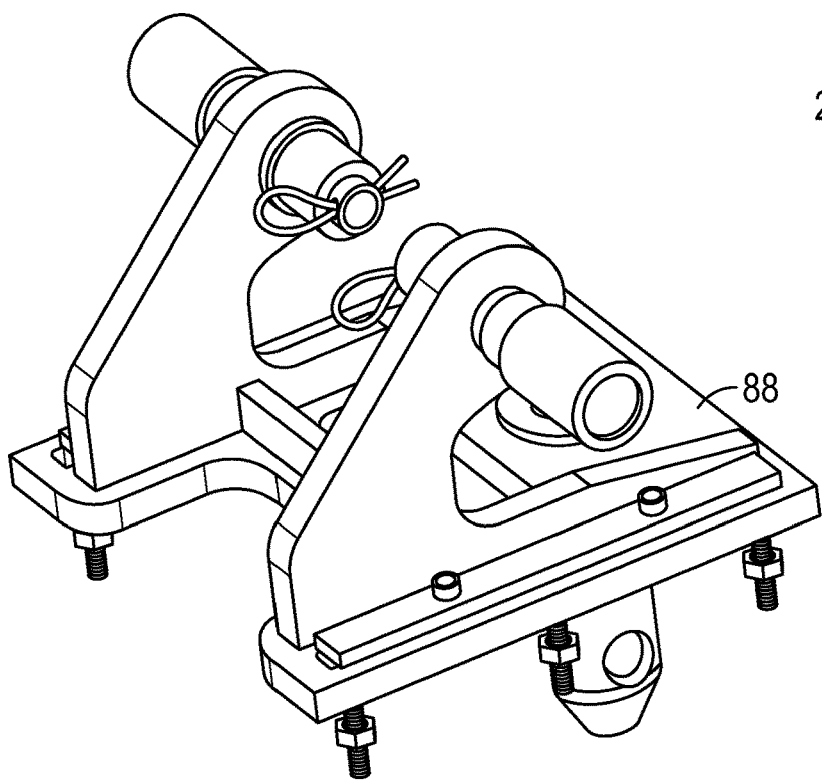

Referring to FIG. 9, in an exemplary embodiment, each of the support arms 68 and 70 have a support arm opening(s) 79 and the elongated body 28 has corresponding body openings 80 that are aligned with the support arm opening 79 when the support structure 36 is in the second position 33. Hitch pins 82 are releasably disposed through the body openings 80 and the support arm openings 79 to hold the support structure 36 in the second position 33.

In an exemplary embodiment, the transport trailer 14 further includes a safety lock mechanism 84 that is coupled to one of the support arms 68 or 70 and the elongated body 24. When the support assembly 18 is moved to the second position 33, the safety lock mechanism 84 releasably locks one of the support arms 68 or 70 to hold the support assembly 18 in the second position 33, for example while a mechanic inserts the hitch pins 82 through the body openings 80 and the support arm openings 79. Further, in an exemplary embodiment, the transport trailer 14 may independently include locking supports for when the trailer 16 is in motion for example on the highway, and/or the locking supports may be integrated with the safety lock mechanism 84 to hold the support assembly 18 in the second position 33.

Referring to FIGS. 6 and 10-11B, pin-bracket attachment components 86 and 88 are coupled to the support frame 66 and extend through the bottom wall 90 of the box 34 to couple the support frame 66 to the oversize load 12. In one example, the pin-bracket attachment components 86 and 88 are initially releasably coupled to the oversize load 12 and then the oversize load 12 is loaded into the box 34 where the pin-bracket attachment components 86 and 88 releasably couple to the support frame 66. In another example, the pin-bracket attachment components 86 and 88 are initially releasably coupled to the support frame 66 and the oversize load 12 is loaded into the box where the pin-bracket attachment components 86 and 88 releasably couple to the oversize load 12.

Although the transport trailer 10 is described herein with a support assembly 18 that moves from a first position 20 with a wide load overhang 44 to a second position 33 to reduce the wide load overhang 44, it is to be understood that various other embodiments of the transport trailer include the support assembly 18 extending over an edge of the trailer 16 in an outwardly direction (e.g., outwardly horizontal direction) other than the width direction 42, for example the length direction 26 or any direction between the width direction 42 and the length direction 26, when in the first position 20, and then moves to the second position 33 to reduce and/or eliminate the overhang in the outwardly direction, for example the length direction or any direction between the width direction 42 and the length direction 26.

Figure 12:
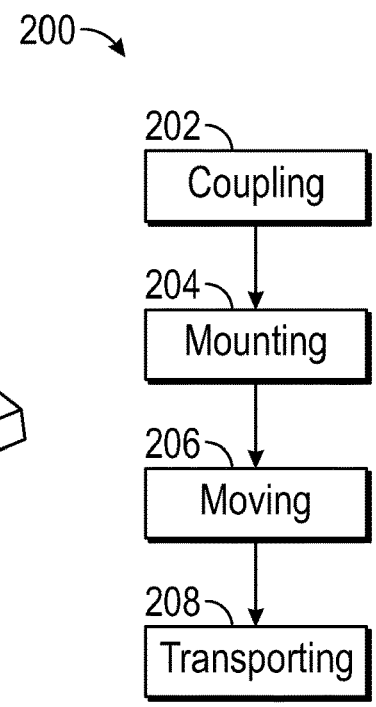
FIG. 12 illustrates a method for transporting an oversize load in accordance with an exemplary embodiment.

Referring to FIG. 12, a method 200 for transporting the oversize load is provided. The method 200 includes coupling (STEP 202) a transport trailer that includes a trailer to a prime mover. The trailer includes an elongated body that extends in a length direction and that has an upper base surface.

The oversize load is mounted (STEP 204) onto a support assembly that is pivotably coupled to the trailer. The support assembly is in a first position extending over the upper base surface and beyond the trailer in a width direction that is transverse to the length direction to define a wide load overhang that extends beyond the trailer in the width direction.

The support assembly is moved (STEP 206) to a second position at an incline relative to the first position to reduce and/or eliminate the wide load overhang. The transport trailer is transported (STEP 208) with the prime mover while supporting the oversize load with the support assembly in the second position.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A transport trailer for carrying an oversize load, the transport trailer comprising:
 a trailer comprising an elongated body that extends in a length direction and that has an upper base surface;
 a support assembly that is configured to support the oversize load and that is pivotably coupled to the trailer to move between a first position and a second position, wherein in the first position, the support assembly extends over the upper base surface and beyond the trailer in a width direction that is transverse to the length direction to define a wide load overhang that extends beyond the trailer in the width direction, and wherein in the second position, the support assembly is positioned at an incline relative to the first position to one of reduce and eliminate the wide load overhang, wherein the support assembly comprises a box that is configured to receive the oversize load when the support assembly is in the first position and to contain the oversize load for transport when the support assembly is in the second position.

2. The transport trailer of claim 1, wherein the box is a substantially "V-shaped" box having an apex portion, a first leg portion, and a second leg portion, and wherein the first and second leg portions flare outwardly from the apex portion in different directions.

3. The transport trailer of claim 2, wherein the trailer has a relief area below the upper base surface, wherein the apex portion, the first leg portion, and the second leg portion are disposed above the upper base surface of the trailer when the support assembly is in the first position, and wherein the apex portion is disposed below the upper base surface and the relief area while the first and second leg portions are disposed above the upper base surface when the support assembly is in the second position.

4. The transport trailer of claim 1, wherein the support assembly further comprises a support structure that comprises a support frame and a support arm and that is coupled to the support frame that supports the box and that is pivotally coupled to the elongated body to move the box between the first and second positions.

5. The transport trailer of claim 4, wherein the box is mounted to the support frame and the support arm is pivotably coupled to the elongated body.

6. The transport trailer of claim 5, further comprising a driver that is coupled to the support assembly and that is configured to move the support assembly between the first and second positions.

7. The transport trailer of claim 6, wherein the driver comprises a hydraulic cylinder that has a first end coupled to the elongated body and a second end that is coupled to the support frame, and wherein the hydraulic cylinder is configured to move the first and second ends relative to each other to move the support assembly between the first and second positions.

8. The transport trailer of claim 5, wherein the support structure further comprises a pivot coupling that pivotably couples the support arm to the elongated body.

9. The transport trailer of claim 5, wherein the support arm has a support arm opening and the elongated body has a body opening that is aligned with the support arm opening when the support structure is in the second position, and wherein the transport trailer further comprises a hitch pin that is configured to be releasably disposed through the body opening and the support arm opening to hold the support structure in the second position.

10. The transport trailer of claim 5, further comprising a safety lock mechanism that is coupled to the support arm and the elongated body and that is configured to releasably lock the support arm in the second position.

11. The transport trailer of claim 5, further comprising at least one pin-bracket attachment component that is configured to extend through a bottom wall of the box and to couple the support frame to the oversize load.

12. The transport trailer of claim 11, wherein the pin-bracket attachment component is configured to releasably couple to the support frame and to the oversize load.

13. The transport trailer of claim 1, wherein the box has a box chamber and comprises a lid that is configured to cover the box chamber.

14. The transport trailer of claim 13, wherein the lid comprises a first lid section and a second lid section that are configured to be disposed adjacent to each other to substantially cover the box chamber.

15. The transport trailer of claim 13, further comprising a lift coupling element and a plurality of cables that couple the lift coupling element to the lid, and wherein the lift coupling element is configured to receive a moveable member for lifting at least a section of the lid to expose the box chamber.

16. The transport trailer of claim 1, wherein in the second position, the support assembly is positioned at an angle of from about 45 to about 75° relative to the first position.

17. The transport trailer of claim 16, wherein in the first position, the support assembly is positioned substantially horizontally.

18. A method for transporting an oversize load, the method comprising the steps of:
coupling a transport trailer that includes a trailer to a prime mover, wherein the trailer comprises an elongated body that extends in a length direction and that has an upper base surface;
mounting the oversize load onto a support assembly that is pivotably coupled to the trailer and that is in a first position extending over the upper base surface and beyond the trailer in a width direction that is transverse to the length direction to define a wide load overhang that extends beyond the trailer in the width direction, wherein the support assembly comprises a box that receives the oversize load with the support assembly in the first position;
moving the support assembly to a second position at an incline relative to the first position to one of reduce and eliminate the wide load overhang; and
transporting the transport trailer with the prime mover while supporting the oversize load with the support assembly in the second position, wherein the box contains the oversize load during transporting with the support assembly is in the second position.

19. A transport trailer for carrying an oversize load, the transport trailer comprising:
a trailer comprising an elongated body that extends in a longitudinal direction and that has an upper base surface;
a support assembly that is configured to support the oversize load and that is pivotably coupled to the trailer to move between a first position and a second position, wherein in the first position, the support assembly extends over the upper base surface and beyond the trailer to define an overhang portion that extends beyond the trailer in an outwardly direction, and wherein in the second position, the support assembly is positioned at an incline relative to the first position to one of reduce and eliminate the overhang portion, wherein the support assembly comprises a box that is configured to receive the oversize load when the support assembly is in the first position and to contain the oversize load for transport when the support assembly is in the second position.

* * * * *